United States Patent [19]

Klimek et al.

[11] Patent Number: 5,724,392
[45] Date of Patent: Mar. 3, 1998

[54] AUTOMATIC PATH DELAY COMPENSATION SYSTEM

[75] Inventors: John Ramon Klimek, Cupertino; David Weiss, Palo Alto, both of Calif.

[73] Assignee: Siemens Business Communication Systems, Inc., Santa Clara, Calif.

[21] Appl. No.: 495,063

[22] Filed: Jun. 26, 1995

Related U.S. Application Data

[63] Continuation of Ser. No. 131,502, Oct. 4, 1993, abandoned.

[51] Int. Cl.⁶ .................................................. H04B 3/00
[52] U.S. Cl. .................... 375/257; 375/354; 375/376; 439/955; 395/828; 395/280
[58] Field of Search .................... 375/211, 215, 375/219, 220, 259, 354, 357, 362, 371, 376, 377; 395/200.02, 200.14, 200.19, 200.2, 828, 830, 834, 878, 881, 882; 370/24, 100.1; 439/43, 46, 49, 63, 119, 146, 166, 488, 489, 578, 894, 955, 135

[56] References Cited

U.S. PATENT DOCUMENTS

| | | |
|---|---|---|
| 4,218,759 | 8/1980 | Carlton et al. .................. 364/900 |
| 4,510,600 | 4/1985 | Tan ................................. 370/94 |
| 4,603,320 | 7/1986 | Farago ........................ 375/121 X |
| 4,852,041 | 7/1989 | Nakano ...................... 375/121 X |
| 5,062,124 | 10/1991 | Hayashi et al. ................ 375/107 |
| 5,134,648 | 7/1992 | Hochfield et al. .............. 379/98 |
| 5,203,004 | 4/1993 | Burton et al. .................. 395/800 |
| 5,257,404 | 10/1993 | Goreham et al. ........... 375/109 X |
| 5,268,937 | 12/1993 | Marbat ............................ 375/121 |
| 5,305,317 | 4/1994 | Szcepanek ..................... 370/85.2 |
| 5,347,113 | 9/1994 | Reddersen et al. ............ 235/462 |

*Primary Examiner*—Stephen Chin
*Assistant Examiner*—Amanda T. Le

[57] ABSTRACT

Automatic cable compensation is provided by a cable connector having an encoder containing cable delay information. The encoder mates with decoding circuitry in a component of an open-loop system which in turn automatically and directly compensates for signal propagation delay by adjusting the transmit timing as dictated by the encoded cable delay.

21 Claims, 6 Drawing Sheets

ABSTRACT

AUTOMATIC PATH DELAY COMPENSATION SYSTEM

CROSS-REFERENCE TO RELATED APPLICATION

This is a continuation of Ser. No. 08/131,502 filed on 4 Oct., 1993 abandoned.

FIELD OF THE INVENTION

This invention generally relates to an apparatus and method for automatically compensating for path propagation delay in an open-loop system. Specifically, the invention is directed to a system that will automatically compensate for propagation delays resulting from interconnecting cables of varying lengths.

The invention is related to the cable connector of the type described in copending U.S. patent application entitled "Cable Connector Keying" by David Weiss and John R. Klimek, the applicants herein, filed Dec. 15, 1992 as U.S. patent application Ser. No. 07/990,738, now U.S. Pat. No. 5,559,964, and the compensation scheme described in copending U.S. patent application entitled "Path Delay Compensation in an Open-Loop System" by David Weiss and John R. Klimek, the applicants herein, filed Dec. 21, 1992 as U.S. patent application Ser. No. 07/994,392. Both of the foregoing applications are assigned to the same assignee as the present patent application and the details of both are incorporated herein by reference.

BACKGROUND OF THE INVENTION

When interconnecting components in an open-loop system, one must provide a means of coordinating communications between the components. Some systems, for example, require that data from one component be received at another component at a specific point in time relative to a system clock. Because of the propagation delay experienced by the data in traveling between the components, one has to account for that delay on the receiving end. When the path delay is variable, for example where the path is a cable and the user desires to change cable lengths to suit the particular application, the accompanying variation in propagation time must be taken into consideration.

It would be helpful to provide a way of communicating such information without having to physically program a module or an EPROM, or manipulate jumpers. Ideally, the information would be conveyed in an automatic and transparent manner.

SUMMARY OF THE INVENTION

These and other objects are achieved by a system that uses information encoded in a connecting cable to adjust the time of transmission of data to cause that data to arrive at a connected component at a fixed time relative to a system clock signal. In one embodiment, the encoding is contained in a keyed cable that automatically conveys the delay of the cable to the interconnected unit. The encoding occurs during the manufacture of the cable, and the information transfer occurs when the cable is plugged into an operating system automatically configuring the system. Thus, the system automatically compensates for cable delay without the need for any further adjustments.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
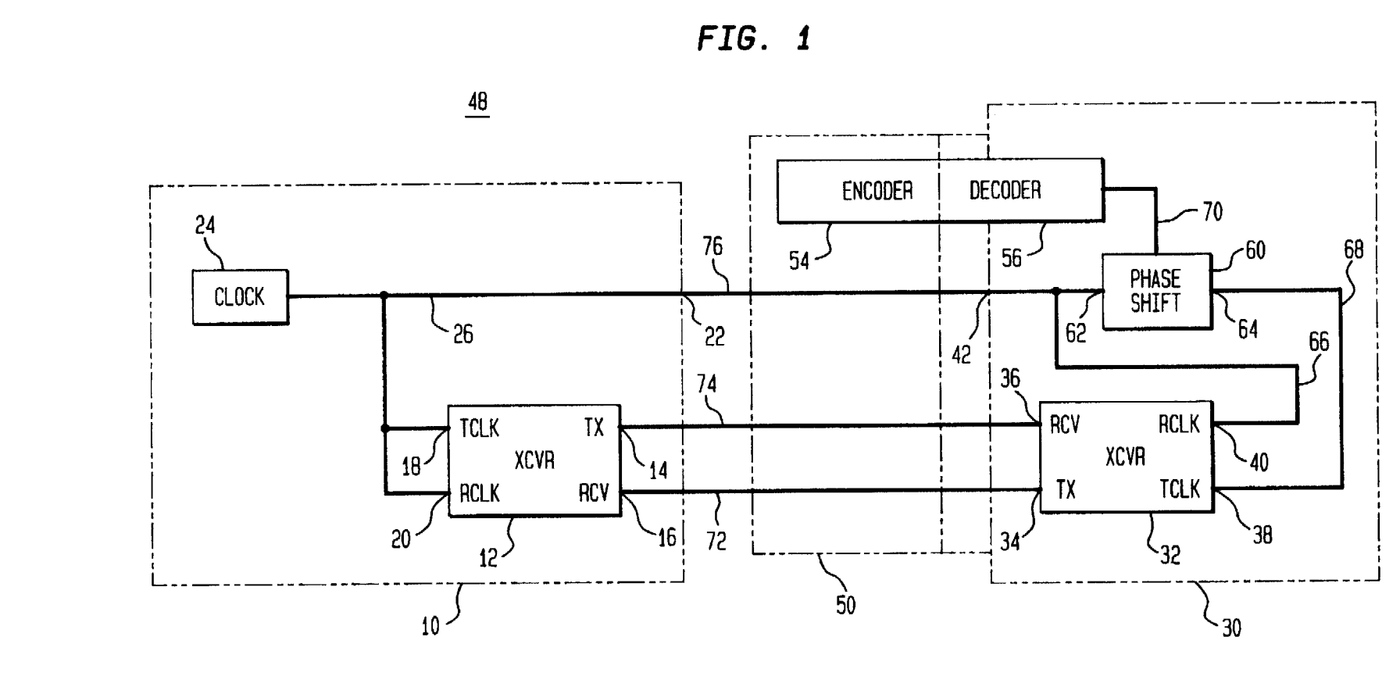
FIG. 1 is a schematic block diagram of a system incorporating the invention.

A block diagram of a communication system is shown in FIG. 1. The system has two communications units, arbitrarily labeled local 10 and remote 30, interconnected by a cable 48. The cable 48 has a connector 50 that mates with a socket 52 on the remote unit 30. Internally, the connector 50 has an encoder 54 that electrically mates with a decoder 56 in the remote unit 30. The decoder 56 is distributed across the socket 52 and a portion of the remote unit 30.

The local unit 10 and the remote unit 30 each have a transmitter-receiver 12, 32. The transmitter-receivers 12, 32 each have a transmit port 14, 34, a receive port 16, 36, a transmit clock input 18, 38, and a receive clock input 20, 40.

The local unit 10 has three ports: the transmit port 14 and the receive port 16 of the transmitter-receiver 12, and a local clock port 22. A clock 24 provides a local clock signal on local timing line 26 to the transmit and receive clock inputs 18 and 20 of the transmitter-receiver 12. The clock signal output is also provided for transmission to the remote unit 30 at the local clock port 22.

The remote unit 30 also has three ports: the transmit port 34 and the receive port 36 of the transmitter-receiver 32, and a remote clock port 42. The remote unit 30 has a phase shift module 60 having an input 62 and an output 64. The input 62 is connected to the remote clock port 42 by an input clock line 66 and the output 64 is connected to a remote timing line 68, which in turn provides transmit timing to the transmitter-receiver 32 through its transmit clock input 38. The input clock line 66 is also connected to the receive clock input 40 of the transmitter-receiver 32. Finally, the phase shift module 60 has a select input 70 from the decoder 56.

The local and remote units 10 and 30 are interconnected by a transmission path, in the case illustrated in FIG. 1 the path being a cable 48. The cable 48 has two unidirectional transmission lines 72 and 74, which may carry data in serial, parallel, or some other form (digital, analog, etc.), and a unidirectional synchronization clock line 76. Line 72 interconnects the transmit port 34 in the remote unit 30 with the receive port 16 in the local unit 10. Similarly, line 74 interconnects the transmit port 14 in the local unit 10 with the receive port 36 in the remote unit 30.

The synchronization clock line 76, being connected between the local clock port 22 and the remote clock port 42, provides the remote unit 30 with the clock timing signal generated in the clock 24 of the local unit 10. The cable 48 could well have other lines but they are not illustrated here.

Because a timing signal is not returned with the data, the system is characterized as open-loop.

The Phase Shift Module

Figure 2:
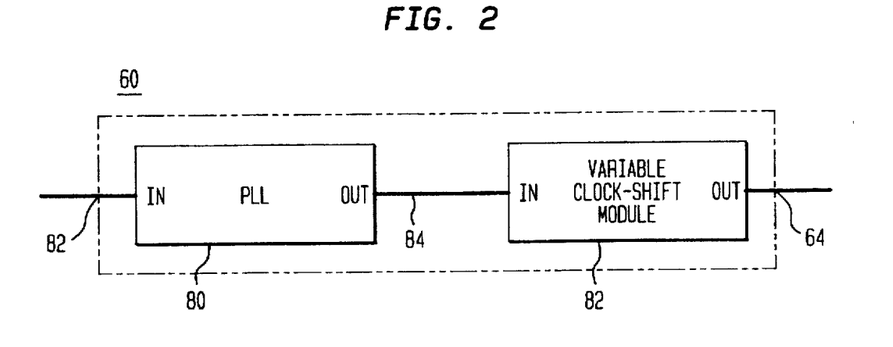
FIG. 2 is a schematic block diagram of the phase shift module.
Figure 3:
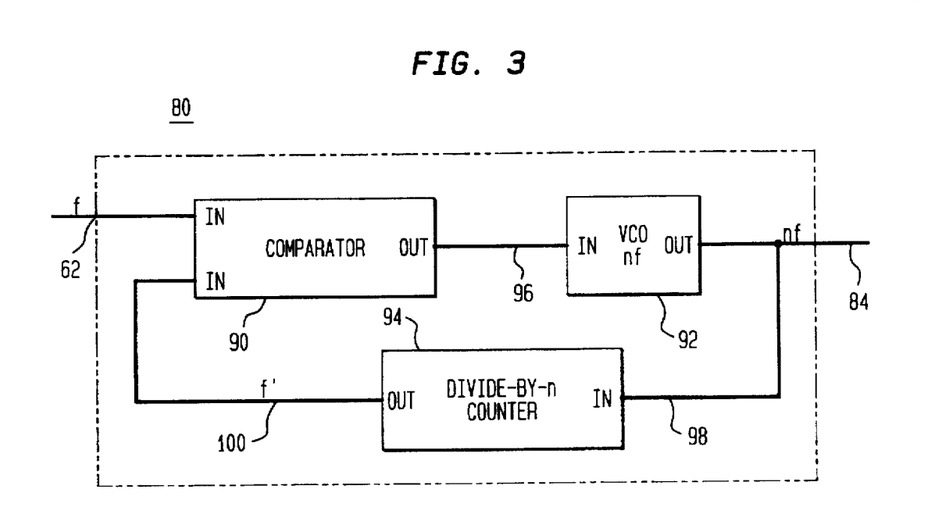
FIG. 3 is a schematic block diagram of the phase-locked loop circuit.

As shown in FIG. 2, the phase shift module 60 has a phase-locked loop 80 feeding a variable clock-shift module 82 through line 84. The phase-locked loop 80, shown in greater detail in FIG. 3, has a comparator 90, a voltage-controlled oscillator 92, and a divide-by-n counter 94, interconnected by lines 96, 98, and 100 as shown in the figure.

Figure 4:
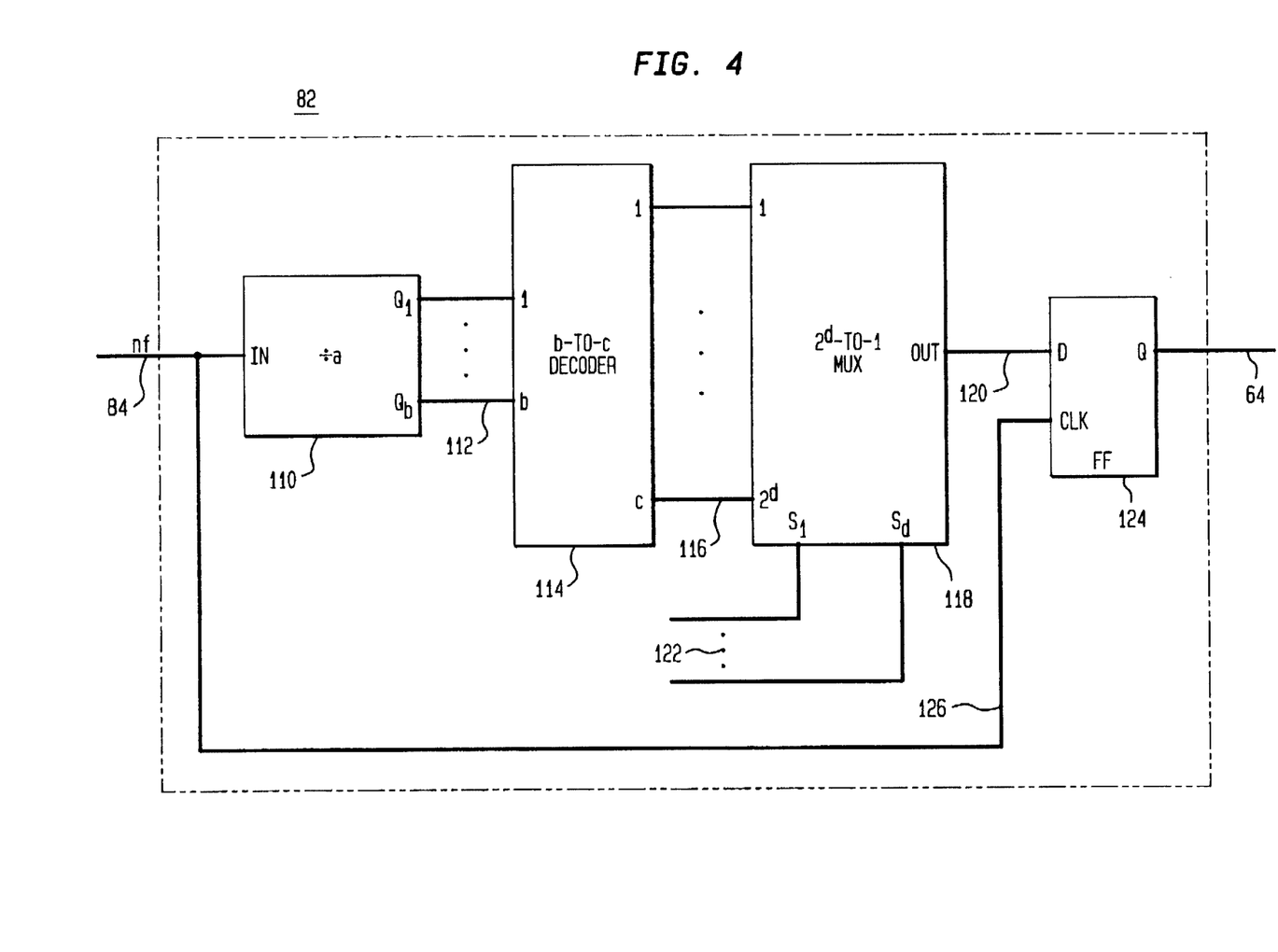
FIG. 4 is a schematic block diagram of the variable clock-shift module.

The variable clock-shift module 82 is shown in FIG. 4. The module 82 divides an input clock signal of frequency nf into $2^d$ selectable pulses at a intervals over some period $\tau$ (=a/nf), where $a \geq d$, each of which has a different phase relationship with respect to each other. The input (line 84) to the module 82 is connected to a divide-by-a counter 110 having b outputs, $Q_1$ through $Q_b$, where $a \geq \log_2 b$ in a binary system. These b outputs are connected by lines 112 to corresponding inputs 1 through b of a b-to-c decoder 114. The outputs 1 through c of the decoder 114 are connected in turn by lines 116 to inputs 1 through $2^d$ of a $2^d$-to-1 multiplexer 118, respectively.

The multiplexer 118 is controlled by select lines 122 connected to select inputs $S_1$ through $S_d$, and its output is connected to the D input of a D-type tip-flop 124. The clock signal for the tip-flop 124 is provided on a clock input line 126 tied to line 84. The output of the module 82 is the Q output of the flip-flop 124, which is also the output 64 of the phase shift module 60. An example of the selectable outputs MUX1–MUX8 of the multiplexer 118 is illustrated by the timing diagram in FIG. 5, which assumes a division-by-8 of the clock signal on line 84.

For simplicity of presentation, there is a one-to-one correspondence between the respective interconnections of the counter 110, the decoder 114, and the multiplexer 118. However, it should be understood that this is not required and one may choose to omit and/or transpose selected connections to suit individual design needs.

The Whole-Bit Data Shift Module

Figure 6:
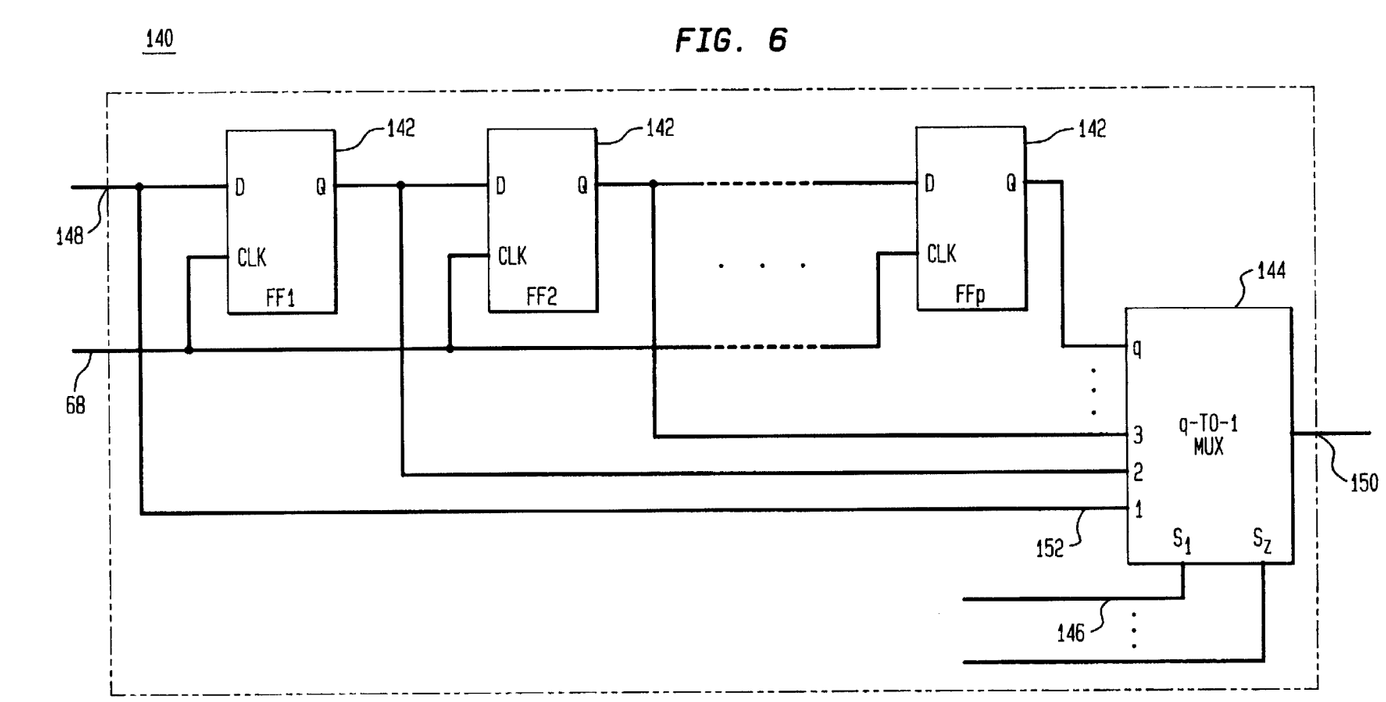
FIG. 6 is a schematic block diagram of the bit delay module.

An additional shift can be obtained from the bit-shifting module 140. This component can be inserted, for example, within the transmitter-receiver 32 at the transmit port 34 in the remote unit 30. The purpose of the bit-shifting module 140 is to adjust the time of transmission of the data in some selected number of whole-bit increments, as determined by the user.

As shown in FIG. 6, the bit-shifting module 140 is a series of p cascaded D-type flip-flops 142, having a data input 148 connected to the D input of the first flip-flop FF1 142. The Q output of every flip-flop 142 but the last is tied to the D input of the next device. The clock input is derived from the output of the phase shift module 60 on line 68. The data input 148 and the Q outputs of the flip-flops are also provided by lines 152 as inputs to a q-to-1 multiplexer 144, where q=p+1. The multiplexer 144 is controlled by z select lines 146 connected to select inputs $S_1$ through $S_z$, to provide an output 150.

The Encoder and Decoder

Figure 7:
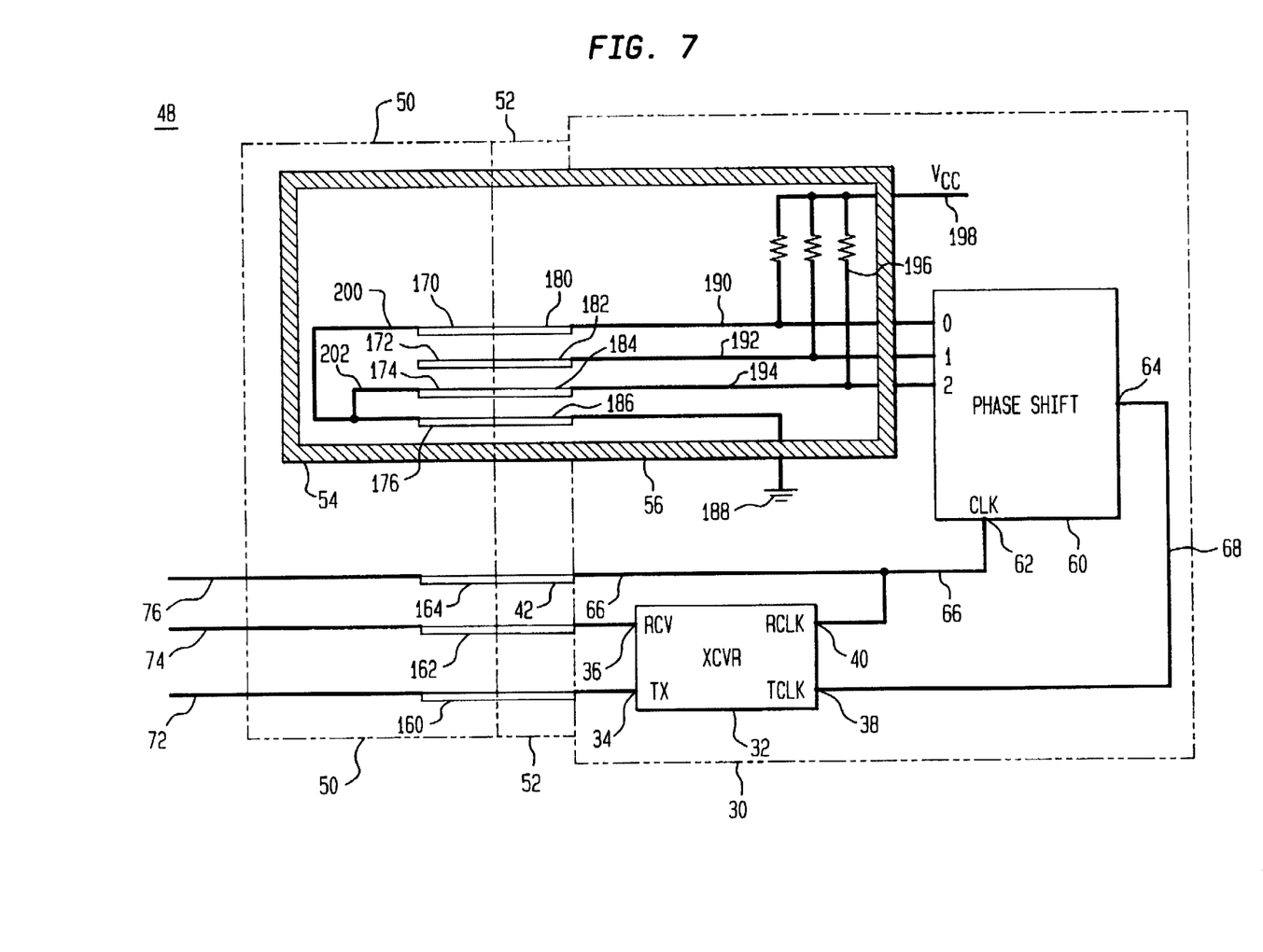
FIG. 7 is a schematic block diagram of the remote module, the encoder, and the decoder.

As illustrated in FIGS. 1 and 7, the cable 48 is attached to a connector 50 that mates with a socket 52 on the remote unit 30. For purposes of clarity, the encoder 54 and the decoder 56 are shown as lightly-shaded boxes, to allow the reader to easily distinguish these components from the rest of the circuitry in FIG. 7. Further, although only one connector/socket combination is illustrated in FIG. 1, it should be understood that the cable 48 could have the same arrangement at each end, irrespective of whether the mating socket has a decoder.

The connector 50, the socket 52, the encoder 54, the decoder 56, and the remote unit 30 are shown schematically in FIG. 7. In addition to the functional pins 160, 162, and 164 connected to the unidirectional transmission lines 72 and 74, and the unidirectional synchronization clock line 76, respectively, and any other j functional pins not illustrated here, the connector 50 has four pins 170, 172, 174, and 176, as shown in the shaded portion of FIG. 7. Correspondingly, the socket 52 has four pins 180, 182, 184, and 186. The number four is arbitrary and used for illustration purposes only; one would provide k+1 pins to convey up to $2^k$ combinatorial code words. The number k in the expression k+1 can be any number greater than or equal to 1. The four pins shown in FIG. 7 will provide up to 8 code words of three bits each. The other j pins could carry dam or other functional information conveyed through the cable 48.

On the remote unit 30 side, one pin 186 is connected to ground 188. The remaining three pins 180, 182, and 184 are connected to key lines 190, 192, and 194. The key lines 190, 192, and 194 are connected through pull-up resistors 196 to some potential shown in FIG 7 as voltage $V_{CC}$ 198. Note that the device could employ pull-down resistors instead of pull-up resistors, connecting key lines 190, 192, and 194 through resistors to ground 188 and pin 186 to $V_{CC}$ 198.

Operation of the System

Consider bidirectional communications between the local and remote units 10 and 30. The local unit 10 transmits data along line 74 to the remote unit 30 along with a synchronizing clock signal on line 76. When the data arrives at the transmitter-receiver 32 in the remote unit 30, it is docked in by the received clock signal applied to receive clock port 40.

To send data from the remote unit 30 to the local unit 10, the timing must now be coordinated as the local unit 10 will be looking for the data at a precise point in time $T_D$ relative to the synchronizing signal (line 26) at the receive clock input 20. This represents the total round trip delay from the local unit 10 to the remote unit 30 and back again.

To achieve a transfer within this period of time, one must account for the propagation delay time of the cable ($T_C$ each way) and the propagation delay of the electronics of the remote unit 30 ($D_E$). Given that a round trip entails passage of the synchronizing clock signal through the cable 48 to the remote unit 30, and then passage of the data through the remote unit 30 and onto and through the cable 48 to the local unit 10, the total delay time $T_D$ will be $2 \cdot T_C + D_E$. The quantity $T_D$ is selected to allow for the largest required round trip transit time.

Since changes in path delay between the units 10 and 30 (denoted as $T_C'$) would result in variations in total propagation time, a variable quantity $T_S$ is utilized to achieve a constant $T_D$, where:

$$2 \cdot T_C' + D_E + T_S = T_D. \tag{1}$$

The time interval $T_S$ represents the shift in time of the data that must occur in the remote unit 30 so that the data is received at the local unit in an elapsed time of $T_D$.

Figure 5:
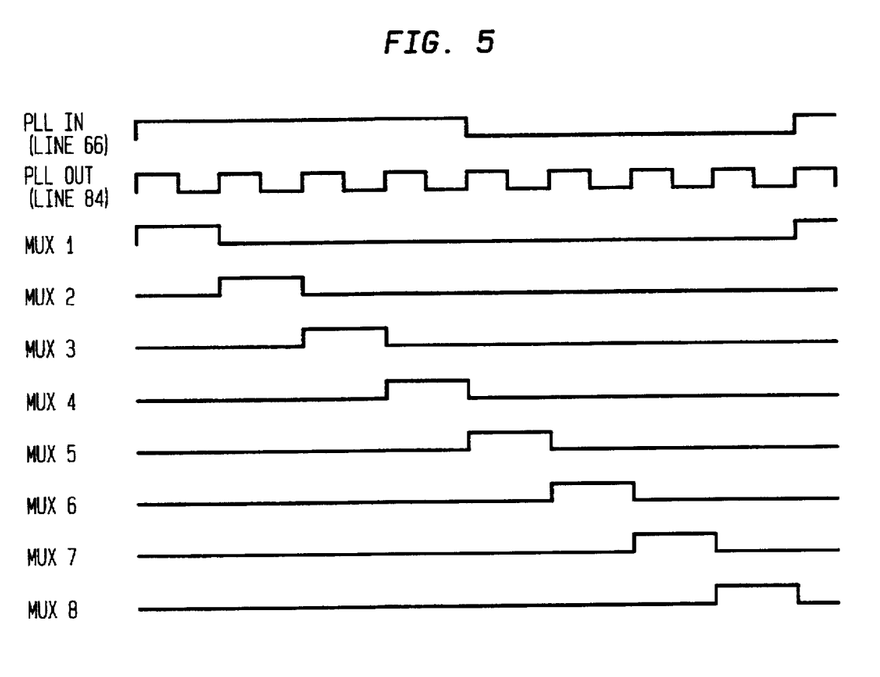
FIG. 5 is a timing diagram showing the outputs of the multiplexer in the variable clock-shift module.

The time shift $T_S$ would have possibly one, two, or more components. The first component is $T_{Sf}$, the fractional bit time shift. Depending on the desired granularity, one could shift the timing of the transmit clock signal at transmit clock input 38 in the remote unit 30 by some fractional portion of one bit length, as illustrated in FIG. 5 using the circuit of FIG. 4, effectively time shifting the data an equivalent amount.

The second component is $T_{sb}$, the whole bit time shift of the data (FIG. 6). This affords a time shift greater than $T_{sf}$. If desired, one could achieve a greater delay by shifting larger units, such as a byte of data. Therefore, the total shift $T_S$ would be the sum of $T_{sf}$, $T_{sb}$, and perhaps a further component. Given that $$T_D = 2 \cdot T_C' + D_E + T_S \tag{2}$$

and, assuming only two components of shift:

$$T_D = 2 \cdot T_C' + D_E + T_{sf} + T_{sb} \tag{3}$$

Since $T_D$ and $D_E$ are fixed numbers, and the value of $T_C'$ is determined by the path delay through the cable 48, one can thus calculate $T_{sf}$ and, if need be, $T_{sb}$. In most applications, insertion of the $T_{sf}$ component will be sufficient. Where a greater delay is desired, one may have to resort to $T_{sb}$. Therefore:

$$T_{sf} + T_{sb} = T_D - (2 \cdot T_C' + D_E) \tag{4}$$

The exact values of $T_{sf}$ and $T_{sb}$ are set by asserting the select lines 122 and 146 of the $2^d$-to-1 multiplexer 118 and the q-to-1 multiplexer 144, respectively. To perform the selection in the outputs of the multiplexers 118 and 144, the appropriate select lines 122 and 146 would be connected to ground or $V_{CC}$, as required. It should be understood that one could use $T_{sb}$ independently of $T_{sf}$ if whole-bit manipulation would provide sufficient resolution. Moreover, if no shift is desired, one could select either an unshifted multiplexer output signal (MUX1 in FIG. 5) or the signal on the input clock line 66. The latter could be provided directly to the transmit clock input 38, bypassing the phase shift module 60.

As shown in FIG. 7, pins 170 and 174 are connected by wires 200 and 202, respectively, to pin 176. Before the connector 50 is inserted into the socket 52, the key lines 190, 192, and 194 are all sitting at $V_{CC}$. The binary code word 111 can conveniently be used to automatically detect that a cable is not connected at all. When the connector 50 is inserted into the socket 52 as illustrated in FIG. 7, one path is created from key line 190 through pin 180, pin 170, wire 200, pin 176, and pin 186 to ground 188. Similarly, another path is created from key line 194 through pin 184, pin 174, wire 202, pin 176, and pin 186 to ground 188. Now, key lines 190 and 194 are at ground potential and only key line 192 remains at $V_{CC}$. The information thus conveyed is 010. By changing the arrangement of the wires within the encoder 54, adding, subtracting, or reordering them, the information would likewise be changed.

The three key lines 190, 192, and 194 are connected to multiplexer select lines 122 (in FIG. 4; 70 in FIG. 1). By inserting the connector 50 into the socket 52, the multiplexer 118 will select one of its $2^d$ inputs. Similarly, additional pins and key lines could be provided to control the select lines 146 of the circuit of FIG. 6, if a whole-bit shift of the data is sought. As noted earlier, the circuit of FIG. 6 may be employed in addition or instead of the scheme of FIG. 4.

Therefore, when the connector 50 is inserted into the socket 52, the encoder 54 and the decoder 56 mate, and the configuration information is passed automatically; enabling the remote unit 30 to transmit data such that it arrives at the local unit 10 at the proper time.

It should be understood that the local and remote clocks may differ in frequency and duty cycle as required by the particular implementation. Also, the transmit data rates and the synchronization clock frequency may differ. Moreover, this scheme can be used with systems having more than two components. For example, where there are three or more communications modules connected in a system, the same method of adjusting the transmit time relative to a clock at the ultimate destination will serve to insure that data arrives at the receiving module at the proper time.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A system comprising:
   a local unit;
   a remote unit; and,
   connecting mechanism used for transmission of data between the local unit and the remote unit, the connecting mechanism including:
   transmission means for transmitting data, and
   encoding means, physically coupled to the transmission means, for encoding a value which indicates propagation delay through the transmission means.

2. A system as in claim 1 wherein the encoder is housed within a first connector which connects the connecting mechanism to the remote unit.

3. A system as in claim 2 wherein the connecting mechanism includes a second connector which connects the connecting mechanism to the local unit.

4. A system as in claim 1 wherein the transmission means includes at least one wire and the encoding means is an encoder which permanently holds a first value.

5. A system as in claim 4 wherein the at least one wire includes:
   a first unidirectional transmission line;
   a second unidirectional transmission line; and,
   a unidirectional synchronization clock line.

6. A system as in claim 5 wherein:
   the first unidirectional transmission line transmits data from the local unit to the remote the second unidirectional transmission line transmits data from the remote unit to the local unit; and,
   the unidirectional synchronization clock line transmits a clock signal from the local unit to the remote unit.

7. A system as in claim 6 wherein the local unit includes:
   a transceiver coupled to the first unidirectional transmission line and the second unidirectional transmission line; and,
   a clock transmission means, coupled to the transceiver and to the unidirectional synchronization clock line, for providing the clock signal to the transceiver and to the unidirectional synchronization clock line.

8. A system as in claim 7 wherein the remote unit includes:
   a decoder coupled to the encoder, the decoder decoding the value encoded by the encoding means to produce a decoded value;
   a phase shifter, coupled to the decoder and to the unidirectional synchronization clock line, the phase shifter shifting the clock signal on the unidirectional synchronization clock line an amount dependent on the decoded value to produce a shifted clock signal on a phase shifter output; and, transceiver coupled to the first unidirectional transmission line and the second unidirectional transmission line, the transceiver having a receipt clock input and a transmission clock input, the receipt clock input being connected to the unidirectional synchronization clock line and the transmission clock input being connected to the phase shifter output.

9. A method for connecting a local unit to a remote unit comprising the steps of:

(a) providing a data transmission path between the remote unit and the local unit; and, (b) within a physical entity which provides the data transmission path, encoding a value which indicates a propagation delay of data transmissions from the local unit to the remote unit.

10. A method as in claim 9 wherein in step (b) the value is encoded within an encoder which permanently holds a first value.

11. A method as in claim 10 wherein the encoder is housed within a first connector which connects the local unit to the remote unit.

12. A method as in claim 9 wherein step (a) includes the following substeps:

providing a first unidirectional transmission line which transmits data from the local unit to the remote unit;

providing a second unidirectional transmission line which transmits data from the remote unit to the local unit; and, providing a unidirectional synchronization clock line which transmits a clock signal from the local unit to the remote unit.

13. A method as in claim 12 additionally comprising the following step:

(d) decoding, by the remote unit, the value to determine a propagation delay through the data transmission path.

14. A method as in claim 13 additionally comprising the following step:

(e) utilizing the value decoded in step (d) to compensate for propagation delay when transmitting data through the second unidirectional line.

15. A connecting mechanism used for transmission of data, the connecting mechanism comprising:

transmission means for transmitting data; and, encoding means, physically coupled to the transmission means, for encoding a value which indicates propagation delay through the transmission means.

16. A connecting mechanism as in claim 15 wherein the connecting mechanism is a cable in a computing system, the transmission means includes at least one wire and the encoding means is an encoder which permanently holds a first value.

17. A connecting mechanism as in claim 16 wherein the at least one wire includes:

a first unidirectional transmission line;

a second unidirectional transmission line; and, a unidirectional synchronization clock line.

18. A connecting mechanism as in claim 17 wherein the encoder is housed within a first connector which connects the connecting mechanism to a remote unit.

19. A connecting mechanism as in claim 18 wherein the connecting mechanism includes a second connector which connects the connecting mechanism to a local unit.

20. A connecting mechanism as in claim 19 wherein:

the first unidirectional transmission line transmits data from the local unit to the remote unit;

the second unidirectional transmission line transmits data from the remote unit to the local unit; and, the unidirectional synchronization clock line transmits a clock signal from the local unit to the remote unit.

21. A system comprising:

a local unit;

a remote unit; and, connecting mechanism used for transmission of data between the local unit and the remote unit, the connecting mechanism including:

transmission means for transmitting data, and encoding means, physically coupled to the transmission means, for encoding a value which indicates propagation delay through the transmission means, wherein attaching said transmission means delivers said value.

* * * * *